United States Patent
Tzeng

(10) Patent No.: US 6,878,482 B2
(45) Date of Patent: Apr. 12, 2005

(54) ANODE STRUCTURE FOR METAL AIR ELECTROCHEMICAL CELLS

(75) Inventor: George Tzong-Chyi Tzeng, Elmsford, NY (US)

(73) Assignee: eVionyx, Inc., Hawthorne, NY (US)

( * ) Notice: Subject to any disclaimer, the term of this patent is extended or adjusted under 35 U.S.C. 154(b) by 211 days.

(21) Appl. No.: 10/161,866

(22) Filed: Jun. 4, 2002

(65) Prior Publication Data

US 2002/0182509 A1 Dec. 5, 2002

Related U.S. Application Data

(60) Provisional application No. 60/295,634, filed on Jun. 4, 2001.

(51) Int. Cl.[7] .............................................. H01M 10/16
(52) U.S. Cl. .......................... 429/66; 429/60; 429/67; 429/233
(58) Field of Search .............................. 429/60, 66, 67, 429/209, 233, 234, 211

(56) References Cited

U.S. PATENT DOCUMENTS

| 5,458,988 A | * | 10/1995 | Putt .............................. 429/27 |
| 2002/0160247 A1 | * | 10/2002 | Tzeng et al. .................. 429/28 |

* cited by examiner

*Primary Examiner*—Michael Barr
*Assistant Examiner*—Monique Wills
(74) *Attorney, Agent, or Firm*—Ralph J. Crispino

(57) ABSTRACT

An anode structure for a metal air electrochemical cell is provided. The structure includes a plurality of compartments, which are at least partially isolated from one another. A metal air cell using the anode structure includes the anode structure having one or more of the compartments partially filled with anode material, a cathode in ionic communication with the anode material, and a separator electrically isolating the cathode and the anode material. The volume of anode material included in the one or more compartments is preferably based on the expected expansion of the anode material.

12 Claims, 2 Drawing Sheets

ANODE STRUCTURE FOR METAL AIR ELECTROCHEMICAL CELLS

RELATED APPLICATIONS

The present application claims priority to U.S. Provisional Patent Application Ser. No. 60/295,634 entitled "ANODE STRUCTURE FOR METAL AIR ELECTROCHEMICAL CELLS" filed on Jun. 4, 2001 by George Tzeng, the entire disclosure of which is incorporated herein by reference in its entirety.

BACKGROUND OF THE INVENTION

1. Field of the Invention

This invention relates to anode structures for metal air electrochemical cells.

2. Description of the Prior Art

Electrochemical power sources are devices through which electric energy can be produced by means of electrochemical reactions. These devices include metal air electrochemical cells such as zinc air and aluminum air batteries. Metal air cells generally include an anode, a cathode, a separator to electrically isolate the anode and the cathode, and an electrolyte to conduct ions between the anode fuel material and the cathode. The cathode generally comprises an air diffusion electrode having a catalyzed layer for reducing oxygen. The electrolyte is usually a caustic liquid that is ionic conducting but not electrically conducting. The anode is an oxidizable metal, such as zinc, aluminum, or magnesium.

Metal air electrochemical cells have numerous advantages over traditional hydrogen-based fuel cells. In particular, the supply of energy provided from metal air electrochemical cells is virtually inexhaustible because the fuel, such as zinc, is plentiful and can exist either as the metal or its oxide. Further, solar, hydroelectric, or other forms of energy can be used to electrically convert the metal from its oxide product back to the metallic fuel form with very high energy efficiency. Additionally, certain metal air electrochemical cells may be mechanically recharged, or refueled, by replacing the metal anode fuel. Unlike conventional hydrogen based fuel cells that require refilling, the fuel of metal air electrochemical cells is recoverable by electrically recharging. The fuel of the metal air electrochemical cells may be solid state, therefore, it is safe and easy to handle and store. In contrast to hydrogen based fuel cells, which use methane, natural gas, or liquefied natural gas to provide as source of hydrogen, and emit polluting gases, the metal air electrochemical cells results in zero emission. The metal air fuel cell batteries operate at ambient temperature, whereas hydrogen-oxygen fuel cells typically operate at temperatures in the range of 150° C. to 1000° C. Metal air electrochemical cells are capable of delivering higher output voltages (1–4.5 Volts) than conventional fuel cells (<0.8V).

One of the principle obstacles of metal air electrochemical cells is the inherent volume expansion of the metal, wherein the electrode shape may vary. Electrode shape change generally involves migration of zinc from the certain regions of the electrode to other reasons, and occurs, in part, as the active electrode material dissolves away during battery discharge. Swelling and deformity of zinc electrodes also occur due to the differences in volume of metallic zinc and its oxidation products zinc oxide and zinc hydroxide. Electrode shape distorts as the zinc is redeposited in a dense solid layer, thereby minimizing available active electrode material and preventing electrolyte access to the electrode interior.

Another obstacle relates to refueling of metal air cells. If the clearance between the anode and cathode is not large enough to accommodate the anode expansion, the cathode may be damaged and hence render refueling difficult or impossible. The distance between anode and cathode should be constant. If the distance between the anode and cathode is not constant, the discharging between the anode and cathode will be uneven. This uneven discharging will cause the anode to bend or deform. This bend on the anode is caused by the volume change due to the metal oxidation. When the anode is bent, the anode area which closer to the cathode discharges faster than the rest of the anode. This will increase the deformation. Therefore, the uneven discharging is magnified, and the problem continues until the bending causes cell failure, for example by shorting with the anode. Also, the uneven discharging will reduce the power output of the cell. If the cell is discharged at very high power, the regions of the anode closer to cathode will be passivated and lose functionality.

In order to refuel, the anode and cathode should have certain distance between them to provide the clearance for the refueling action. Conventionally, this clearance is filled with electrolyte and separator. However, this clearance will increase the cell internal resistance. This internal resistance will generate heat during use, which may cause various detriments. The heat consumes power from the cell, will dry out the electrolyte quickly, and speeds up the deterioration of the fuel cell. In order to reduce the internal resistance, the distance between the anode and cathode should be small and even. However, this conventionally sacrifices durability. During the refueling process, if the distance between anode and cathode is not sufficient, the anode may scrape the cathode surface. However, excess clearance, while reducing the likelihood of cathode damage during the refueling, increases the internal resistance. Therefore, conventionally provision of sufficient clearance between the anode and cathode results in increased internal resistance between them.

There remains a need in the art for an improved cell structure, particularly a cell structure that accommodates for anode expansion and allows for easy refuelability.

SUMMARY OF THE INVENTION

The above-discussed and other problems and deficiencies of the prior art are overcome or alleviated by the several compositions, methods and apparatus of the present invention, wherein an anode structure for a metal air electrochemical cell is provided. The structure includes a plurality of compartments, which are at least partially isolated from one another. A metal air cell using the anode structure includes the anode structure having one or more of the compartments partially filled with anode material, a cathode in ionic communication with the anode material, and a separator electrically isolating the cathode and the anode material. The volume of anode material included in the one or more compartments is preferably based on the expected expansion of the anode material.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1A:
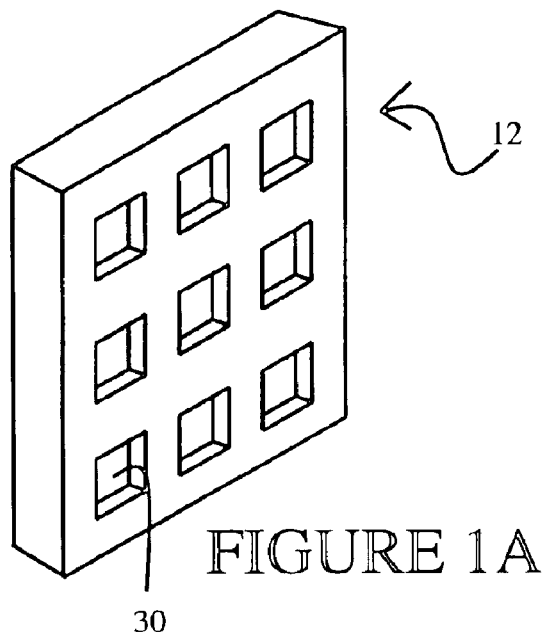
FIG. 1A is an isometric view of an embodiment of an anode structure herein.

An anode structure for a metal air electrochemical cell is disclosed herein. The structure includes a plurality of compartments, which are at least partially isolated from one another. Each of the compartments is dimensioned to hold a quantity of anode material, which has a volume less than that of the compartment. The extra space in the compartment is provided in order to accommodate expansion of the anode material that occurs during electrochemical reaction.

Referring now to the drawings, illustrative embodiments of the present invention will be described. For clarity of the description, like features shown in the figures shall be indicated with like reference numerals and similar features as shown in alternative embodiments shall be indicated with similar reference numerals.

FIG. 1A is an isometric view of one embodiment of a grid shaped anode structure 12. The anode structure 12 includes a plurality of compartments 30. Although the compartments 20 are depicted as squares, it is intended that any suitable shaped compartment may be used. For example, in certain embodiments, slots are desired, having relatively small heights (in the x-direction) and large widths (in the y-direction). The compartments 30 may be in complete physical isolation from one another, or alternatively, may be in partial isolation from one another. For example, pores or channels may be provided between one or more of the compartments to provide partial access from connected compartments. These pores or channels may also provide additional volume to accommodate anode expansion.

The material of construction for the anode structure may be any suitable material capable of imparting the necessary structural integrity, and can withstand the electrochemical environment, including the electrolyte and the thermal limits. These materials may be electrically non-conductive, or alternatively conductive, wherein the anode structure 12 further serves as a current collector. Suitable electrically non-conductive materials include, but are not limited to, acrylonitrile butadiene styrene polymer, polyvinyl chloride, epoxy glass, fluorocarbons, polycarbonate, the like, and combinations comprising at least one of the foregoing materials. Suitable electrically conductive materials include, but are not limited to, copper, plated ferrous metals such as stainless steel, tin, brass, lead, silver, and the like, and combinations and alloys comprising at least one of the foregoing materials.

Figure 1B:
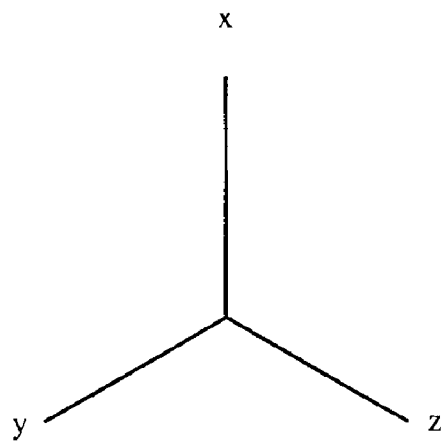
FIG. 1B is an isometric view of one compartment of the anode structure of FIG. 1A.
Figure 1B:
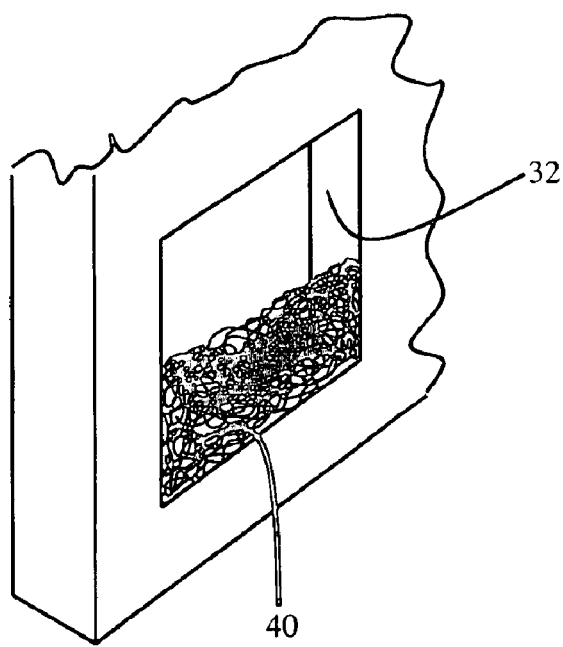

Referring now to FIG. 1B, an enlarged view of a compartment 30 is depicted. The compartment 30 includes a quantity of anode material 40. As described above, the quantity of anode material 40 relates to the volume of the compartment 30, while allowing for additional volume to accommodate for expansion of anode material during electrochemical reaction. Preferably, the volume of the compartment 30 and the quantity of anode material 40 (and accordingly, the properties of the anode material 40 such as the viscosity) are coordinated to minimize anode expansion in the direction if the Z-axis (as indicated in FIG. 1B). Generally, the volume of the compartment 30 and the quantity of anode material 40 are selected such that the pressure caused by anode expansion in the Z-direction is less than about 1 psi, and preferably less than about 0.5 psi, and more preferably less than about 0.2. psi. Further, the volume of anode material preferably allows for sufficient electrical production when the anode structure 12 having anode material 40 therein is used in an electrochemical cell, as described further herein. Typically, the initial volume of anode material 40 is related to the viscosity of the anode material. In general, as the viscosity of the anode material increases, the initial volume of the anode material 40 decreases, and accordingly, as the viscosity of the anode material decreases, the initial volume of the anode material 40 increases.

Preferably, the volume of the compartment 30 is selected based on the properties of the anode material 40. For example, one method of selecting the volume of a compartment 30 is to set a depth (Z-direction) of the compartment 30. Based on any width (Y-direction), the maximum height increase (X-direction) due to anode expansion is ascertained, based on the desired electrochemical operation (e.g., length of time, current density, etc.). Thus, to optimize the overall contact area (with respect to a cathode) of anode material, the height is selected which is preferably approximate to or slightly greater than the maximum height increase.

For example, in one embodiment, a nonconductive anode structure is used with approximately 60% solid loaded zinc paste (using 2% gelling agent, such as Carbopol® 675 available from BF Goodrich Company, Charlotte, N.C., in 35–45% KOH solution). This paste has a relatively high viscosity. Accordingly, a compartment 30 was used having the following dimensions:

1 inch width—x-direction (25.4 mm)

1/8 inch height—y-direction (3.18 mm)

1/16 inch thickness—z-direction (1.59 mm)

One side of the structure includes a current collector adhered thereto. The zinc paste is loaded into the compartments to a height of about 1/16 inches (1.59 mm), leaving 1/16 inches (1.59 mm) open at the top of the compartment, allowing for volume expansion of the zinc paste. At 1/16 inches (1.59 mm) material height, expansion in the z-direction may be minimized or eliminated using a 60% solid loaded –2% Carbopol® 675 gelling agent zinc paste. Note that the compartment width is not a critical constraint, thus can be much wider (e.g., 2×, 3×, 4×, or even wider).

During initial usage of the anode structure 12 having anode material 40 therein, the area of ionic contact between the anode material and a cathode will generally be a function of the initial volume of the anode material (less the portions of the anode structure 12 not having compartments 30, i.e., the grids between the compartments 30). Over time, due to the expansion of the anode material that occurs during electrochemical reaction, the area of contact will accordingly increase.

The anode material 40 generally comprises a metal constituent and an ionic conducting medium. In certain embodiments, the ionic conducting medium comprises an electrolyte, such as an aqueous electrolyte, and a gelling agent. Preferably, the formulation optimizes ion conduction rate, density, and overall depth of discharge.

The metal constituent may comprise mainly oxidizable metals such as zinc, aluminum, magnesium, calcium, lithium, ferrous metals, and combinations and alloys comprising at least one of the foregoing metals. These metals may also be alloyed with constituents including, but not limited to, bismuth, calcium, magnesium, aluminum, indium, lead, mercury, gallium, tin, cadmium, germanium, antimony, selenium, thallium, or combinations comprising at least one of the foregoing constituents. In certain embodiments, the metal constituent of the anode comprises zinc or combinations and alloys comprising zinc.

The metal constituent may be provided in the form of powder, dust, granules, flakes, needles, pellets, fibers, or other particles. In certain embodiments, granule metal, particularly zinc alloy metal, is provided having mesh sizes from about 10 to about 325, preferably about 20 to about 300, and more preferably about 30 to about 200.

The electrolyte generally comprises ion conducting material to allow ionic conduction between the metal anode and the cathode. An ion conducting amount of electrolyte is provided in the electrochemical cell and/or within the anode material 40. The electrolyte generally comprises ionic conducting materials such as KOH, NaOH, LiOH, RbOH, CsOH other materials, or a combination comprising at least one of the foregoing electrolyte media. In preferred embodiments, the hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 45% ionic conducting materials.

The gelling agent for the anode material may be any suitable gelling agent in sufficient quantity to provide the desired consistency of the material. The gelling agent may be a crosslinked polyacrylic acid (PAA), such as the Carbopol® family of crosslinked polyacrylic acids (e.g., Carbopol® 675 available from BF Goodrich Company, Charlotte, N.C.), Alcosorb® G1 commercially available from Allied Colloids Limited (West Yorkshire, GB), and potassium and sodium salts of polyacrylic acid; carboxymethyl cellulose (CMC), such as those available from Aldrich Chemical Co., Inc., Milwaukee, Wis.; hydroxypropylmethyl cellulose; gelatine; polyvinyl alcohol (PVA); poly(ethylene oxide) (PEO); polybutylvinyl alcohol (PBVA); combinations comprising at least one of the foregoing gelling agents; and the like. Generally, the gelling agent concentration is from about 0.1% to about 10% preferably about 1% to about 5%.

Optional additives may be provided, for example, to prevent corrosion. Suitable additives include, but are not limited to indium oxide; zinc oxide, EDTA, surfactants such as sodium stearate, potassium Lauryl sulfate, Triton® X-400 (available from Union Carbide Chemical & Plastics Technology Corp., Danbury, Conn.), and other surfactants; the like; and derivatives, combinations and mixtures comprising at least one of the foregoing additive materials. However, one of skill in the art will determine that other additive materials may be used.

The anode structure 12 may also comprise a current collector (not shown), which can be any electrically conductive material capable of providing electrical conductivity and optionally capable of providing support to hold the anode material 40 within the anode structure. Obviously, if the anode structure is formed of electrically conductive material, a separate current collector is not required. If a non-conductive material is used for the anode material, the current collector may be adhered or otherwise secured to one surface of the anode structure. The current collector may be in the form of a mesh, porous plate, metal foam, strip, wire, foil, plate, or other suitable structure. Preferably, the current collector is fabricated in a form that facilitates removal of discharged metal fuel. The current collector may be formed of various electrically conductive materials including, but not limited to, copper, plated ferrous metals such as stainless steel, tin, brass, lead, silver, nickel, carbon, electrically conducting polymer, electrically conducting ceramic, other electrically conducting materials that are stable in alkaline environments and do not corrode the electrode, or combinations and alloys comprising at least one of the foregoing materials.

Figure 1C:
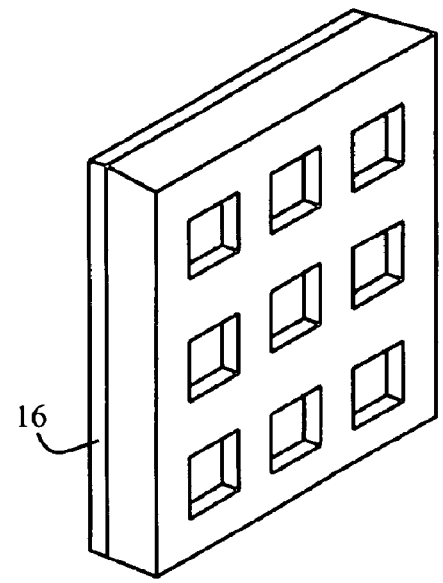
FIG. 1C is an isometric view of the anode structure of FIG. 1A including a separator attached thereto.

Referring now to FIG. 1C, the anode structure 12 includes a separator 16 attached thereto. The separator 16 may be any commercially available separator capable of electrically isolating the anode material 40 from an associated cathode in an electrochemical cell, while allowing sufficient fluid and ionic transport between the anode material and the cathode. Preferably, the separator is flexible, to accommodate electrochemical expansion and contraction of the cell components, and chemically inert to the cell chemicals. Suitable separators are provided in forms including, but not limited to, woven, non-woven, porous (such as microporous or nanoporous), cellular, polymer sheets, and the like. Materials for the separator include, but are not limited to, polyolefin (e.g., Gelgard® commercially available from Celgard LLC, Charlotte, N.C.), polyvinyl alcohol (PVA), cellulose (e.g., cellophane, cellulose acetate, and the like), polyamide (e.g., nylon), fluorocarbon-type resins (e.g., the Nafion® family of resins which have sulfonic acid group functionality, commercially available from DuPont Chemicals, Wilmington, Del.), filter paper, and combinations comprising at least one of the foregoing materials. The separator may also comprise additives and/or coatings such as acrylic compounds and the like to make them more wettable and permeable to the electrolyte. Further, the separator 16 may provide electrolyte to the electrochemical cell, for example in the form of a solid-state membrane. Suitable membranes are described in commonly assigned: U.S. Pat. No. 6,183,914, entitled "Polymer-based Hydroxide Conducting Membranes", to Wayne Yao, Tsepin Tsai, Yuen-Ming Chang, and Muguo Chen, filed on Sep. 17, 1998; U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. Pat. No. 6,358,651 entitled "Solid Gel Membrane Separator in Rechargeable Electrochemical Cells", by Muguo Chen, Tsepin Tsai and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties.

Figure 2:
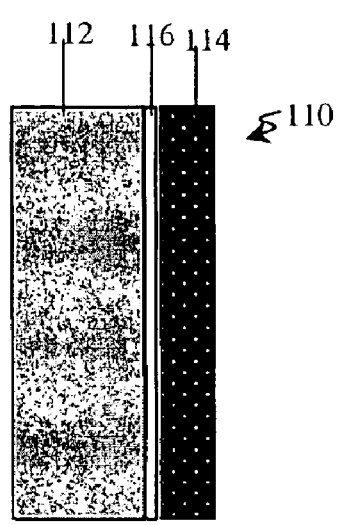
FIG. 2 is a schematic representation of a metal air electrochemical cell configuration.

FIG. 2 is a schematic representation of an electrochemical cell 110. Electrochemical cell 110 may be a metal oxygen cell, wherein the metal is supplied from an anode structure 112 having anode material therein, and the oxygen is supplied to an oxygen cathode 114. The anode structure 112 and the cathode 114 are maintained in electrical isolation from on another by a separator 116. Oxygen from the air or another source is used as the reactant for the air cathode 114 of the metal air cell 110. When oxygen reaches the reaction sites within the cathode 114, it is converted into hydroxyl ions together with water. At the same time, electrons are released to flow as electricity in the external circuit. The hydroxyl travels through the separator 116 to reach the anode material within the anode structure 112. When hydroxyl reaches the metal anode (in the case of anode material comprising, for example zinc), zinc hydroxide is formed on the surface of the zinc. Zinc hydroxide decomposes to zinc oxide and releases water back to the alkaline solution. The reaction is thus completed.

The anode reaction is:

$$Zn + 4OH^- \rightarrow Zn(OH)_4^{2-} + 2e \quad (1)$$

$$Zn(OH)_4^{2-} \rightarrow ZnO + H_2O + 2OH^- \quad (2)$$

The cathode reaction is:

$$\tfrac{1}{2}O_2 + H_2O + 2e \rightarrow 2OH^- \quad (3)$$

Thus, the overall cell reaction is:

$$Zn + \tfrac{1}{2}O_2 \rightarrow ZnO \quad (4)$$

The oxygen supplied to the cathode 114 may be from any oxygen source, such as air; scrubbed air; pure or substantially oxygen, such as from a utility or system supply or from on site oxygen manufacture; any other processed air; or any combination comprising at least one of the foregoing oxygen sources.

Cathode 114 may be a conventional air diffusion cathode, for example generally comprising an active constituent and a carbon substrate, along with suitable connecting structures, such as a current collector. Typically, the cathode catalyst is selected to attain current densities in ambient air of at least 20 milliamperes per squared centimeter (mA/cm$^2$), preferably at least 50 mA/cm$^2$, and more preferably at least 100 mA/cm$^2$. Of course, higher current densities may be attained with suitable cathode catalysts and formulations, and varying degrees of oxygen purity and pressure. The cathode 114 may be a bi-functional, for example, which is capable of both operating during discharging and recharging. An exemplary air cathode is disclosed in copending, commonly assigned U.S. Pat. No. 6,368,751, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

The carbon used is preferably be chemically inert to the electrochemical cell environment and may be provided in various forms including, but not limited to, carbon flake, graphite, other high surface area carbon materials, or combinations comprising at least one of the foregoing carbon forms. The cathode current collector may be any electrically conductive material capable of providing electrical conductivity and optionally capable of providing support to the cathode 114. The current collector may be in the form of a mesh, porous plate, metal foam, strip, wire, foil, plate, or other suitable structure. In certain embodiments, the current collector is porous to minimize oxygen flow obstruction. The current collector may be formed of various electrically conductive materials including, but not limited to copper, nickel, nickel plated ferrous metals such as stainless steel, chromium, titanium and the like, and combinations and alloys comprising at least one of the foregoing materials. Suitable current collectors include porous metal such as nickel foam metal.

A binder is also typically used in the cathode 114, which may be any material that adheres substrate materials, the current collector, and the catalyst to form a suitable structure. The binder is generally provided in an amount suitable for adhesive purposes of the diluent, catalyst, and/or current collector. This material is preferably chemically inert to the electrochemical environment. In certain embodiments, the binder material also has hydrophobic characteristics. Appropriate binder materials include polymers and copolymers based on polytetrafluoroethylene (e.g., Teflon® powder or emulsions such as and Teflon® T-30 commercially available from E.I. du Pont Nemours and Company Corp., Wilmington, Del.), sulfonic acid (e.g., Nafion® commercially available from E.I. du Pont Nemours and Company Corp.), polyvinyl alcohol (PVA), poly(ethylene oxide) (PEO), polyvinylpyrrolidone (PVP), polyvinylidene fluoride (PVDF), polyethylene fluoride (PEF), and the like, and derivatives, combinations and mixtures comprising at least one of the foregoing binder materials. However, one of skill in the art will recognize that other binder materials may be used.

The active constituent is generally a suitable catalyst material to facilitate oxygen reaction at the cathode 114. The catalyst material is generally provided in an amount suitable to facilitate oxygen reaction at the cathode 114. Suitable catalyst materials include, but are not limited to: manganese and its compounds, lanthanum and its compounds, strontium and its compound cobalt and its compounds, platinum and its compounds, and combinations comprising at least one of the foregoing catalyst materials.

To electrically isolate the anode 112 from the cathode 114, the separator 116 is provided between the electrodes. In the cell 110 herein, the separator 116 may be disposed on the anode 12 to at least partially contain the anode material.

Figure 3A:
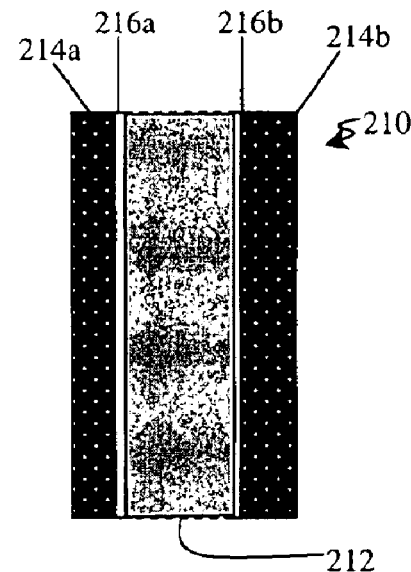
FIG. 3A is a schematic representation of another metal air electrochemical cell configuration.

Referring now to FIG. 3A, an embodiment of a monopolar cell 210 is depicted. Cell 210 comprises an anode structure 212 and a pair of cathode portions 214a and 214b. Separators 216a and 216b are disposed between anode 212 and cathodes 214a and 214b for electrical isolation. The anode structure 212 includes anode material therein. The separators 216a and 216b may be disposed on major surfaces of the anode structure 212. Alternatively, the separators 216a and 216b may be disposed on the cathodes 214a and 214b. Various configurations will be apparent to one skilled in the art.

Figure 3B:
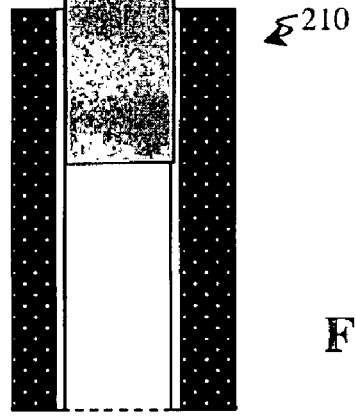
FIG. 3B shows removal of an anode structure in the metal air electrochemical cell shown in FIG. 3A.

FIG. 3B shows the ability to remove the anode structure 212 from the cell 210. This is particularly useful in mechanically rechargeable or refuelable configurations. Using the anode structure described herein, removal of a used anode structure is facilitated, as desired anode structures minimize expansion in the z-direction, leaving the originally provided clearance between the anode and cathode.

Figure 4:
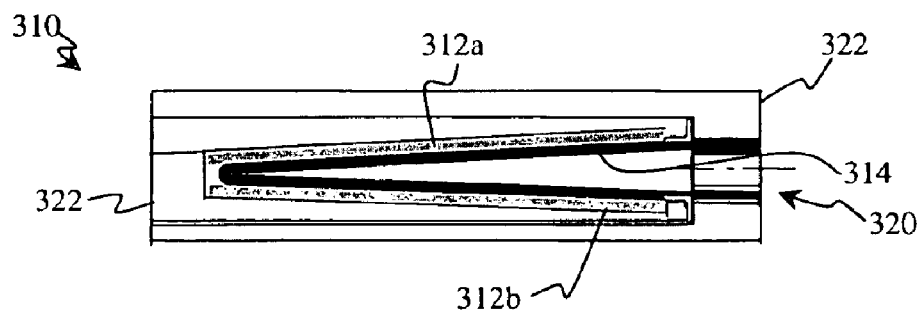
FIG. 4 is a schematic representation of another metal air electrochemical cell configuration.

FIG. 4 shows a cathode structure 320 and an anode cartridge 322 assembled to form an electrochemical cell 310. The cathode structure 320 includes a cathode surface 314, which may include a pair of major surface for ionic communication with a pair of anode structures 312a and 312b. Alternatively, the cathode structure may have a cathode surface 314 having a single major surface for contact with one anode structure (not shown). Preferably, a pair of major cathode surfaces are disposed at opposing angle, generally to form a wedge structure.

The anode cartridge 322 comprises a pair of anode structures 312a and 312b, generally having a plurality of compartments with anode material therein as described above. The anode structures 312a and 312b are formed or disposed on inside surfaces of the cavity within the cartridge 322. The angle between these two anode structures 312a and 312b is preferably close to the angle of the cathode surfaces forming the wedge shape, and more preferably the angle between these two anode structures 312a and 312b is identical to the angle of the cathode surfaces.

Similar configurations as that described with respect to FIG. 4 are more fully described in U.S. patent application Ser. No. 10/074,893 entitled "Metal Air Cell System" by George Tzeng and Craig Cole filed on Feb. 11, 2002, which is incorporated herein by reference.

While FIGS. 2–4 depict certain metal air cell configurations, the anode structure may be used in many other configurations of metal air cells. The shape of the cell and of the components therein is not constrained to be square or rectangular; it can be tubular, circular, elliptical, polygonal, or any desired shape. Further, the configuration of the cells components, i.e., vertical, horizontal, or tilted, may vary.

Another application of the anode structure is in a cell that is in selectively ionic communication with the cathode via physical separation, such as described in U.S. patent application Ser. No. 10/145,278, entitled "Metal Air Cell Incorporating Reaction Rate Control Systems" by Sadeg M. Faris filed on May 14, 2002, which claims priority to U.S. Provisional Patent Application No. 60/290,945 filed on May 14, 2001 and No. 60/313,764 filed on Aug. 21, 2001, both entitled "Metal Air Cell Incorporating Reaction Rate Control Systems", both by Sadeg M. Faris, which are all incorporated by reference herein.

Various benefits may be derived from the anode structure and electrochemical cells using the anode structure described herein. Particularly, detriments related to anode expansion and shape change are eliminated. Consequently, the anode structure may readily be removed from the cell since the distance between components remains constant. This is particularly useful, for example, for refueling of cells, wherein a spent anode structure may be replaced with a fresh anode structure. Alternatively, refueling may be carried out by removing the anode structure, replacing the anode material therein, and replacing the replenished anode structure.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An anode structure for a metal air electrochemical cell comprises:

a plurality of compartments having an opening on a cathode side of the anode structure, each compartment at least partially isolated from one another and configured to hold a quantity of anode material, the quantity of anode material being selected to minimize anode expansion in the direction of the cathode side.

2. The anode structure as in claim 1, wherein the viscosity of the anode material is related to the volume of anode material provided in the compartment.

3. The anode structure as in claim 1, wherein the compartment has a height of less than 10 mm.

4. The anode structure as in claim 1, wherein the compartment has a height of less than 5 mm.

5. The anode structure as in claim 1, wherein the compartment has a height of less than 3.25 mm.

6. The anode structure as in claim 5, wherein the anode material is filled to a height in the compartment of less than 1.6 mm.

7. The anode structure as in claim 6, wherein the anode material comprises a metal constituent, a caustic electrolyte, and a gelling agent.

8. The anode structure as in claim 1, wherein the anode material is filled to a height in the compartment of less than 50% of the height of the compartment.

9. A metal air cell comprising:

the anode structure of claim 1, wherein one or more of the compartments comprise a quantity of anode material, a cathode in ionic communication with the anode material, and a separator electrically isolating the cathode and the anode material.

10. The metal air cell as in claim 9, wherein the anode material comprises a metal constituent, a caustic electrolyte and a gelling agent.

11. The metal air cell as in claim 9, wherein the separator is adhered to a surface of the anode structure.

12. The metal air cell as in claim 9, wherein the anode structure of claim 1 is configured to be removed when the anode material is substantially discharged.

* * * * *